United States Patent
Cederlof et al.

(10) Patent No.: US 7,206,881 B2
(45) Date of Patent: Apr. 17, 2007

(54) ARRANGEMENT AND METHOD FOR CONTROLLING DATAFLOW ON A DATA BUS

(75) Inventors: Mans Cederlof, Gothenburg (SE); Mattias Johansson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 104 days.

(21) Appl. No.: 10/528,064

(22) PCT Filed: Sep. 16, 2002

(86) PCT No.: PCT/SE02/01672

§ 371 (c)(1),
(2), (4) Date: Mar. 15, 2005

(87) PCT Pub. No.: WO2004/025487

PCT Pub. Date: Mar. 25, 2004

(65) Prior Publication Data

US 2006/0155901 A1    Jul. 13, 2006

(51) Int. Cl.
  *G06F 13/42*    (2006.01)
  *H04L 29/08*    (2006.01)
  *H04L 12/00*    (2006.01)
  *G06F 13/14*    (2006.01)

(52) U.S. Cl. .............. 710/106; 710/100; 710/305; 370/912; 370/423; 370/252; 709/235

(58) Field of Classification Search .............. 710/18, 710/29–32, 38, 100, 106, 305; 709/249, 709/231, 250, 201, 238, 232–235; 370/912, 370/423, 229–235, 252; 712/28–30
See application file for complete search history.

(56) References Cited

U.S. PATENT DOCUMENTS 4,261,035 A    4/1981    Raymond
(Continued)

FOREIGN PATENT DOCUMENTS

EP    0 238 255 B1    7/1992
(Continued)

OTHER PUBLICATIONS

"Improving the satellite communication efficiency of the accumulative acknowledgement strategies" by Duarte et al. (abstract only) Publication Date: Nov. 27-30, 1989.*
(Continued)

*Primary Examiner*—Gopal C. Ray
(74) *Attorney, Agent, or Firm*—Nixon & Vanderhye P.C.

(57) ABSTRACT

The present invention relates to a method and arrangement for controlling dataflow on a databus, especially for avoiding reception problems by a receiver unit. The databus connects at least one receiver unit to one or several transmitter units. The method comprises the steps of transmitting by the receiver unit on the databus a control data sequence to be received by the transmitting units, which alter transmission mode.

15 Claims, 2 Drawing Sheets

U.S. PATENT DOCUMENTS

| | | | |
|---|---|---|---|
| 5,007,051 A | | 4/1991 | Dolkas et al. |
| 5,299,313 A | * | 3/1994 | Petersen et al. ............ 709/234 |
| 5,473,604 A | * | 12/1995 | Lorenz et al. .............. 370/229 |
| 5,485,584 A | * | 1/1996 | Hausman et al. ............. 710/22 |
| 5,822,618 A | * | 10/1998 | Ecclesine ..................... 710/57 |
| 5,878,279 A | | 3/1999 | Athenes |
| 6,026,088 A | * | 2/2000 | Rostoker et al. ....... 370/395.53 |
| 6,031,843 A | * | 2/2000 | Swanbery et al. .......... 370/426 |
| 6,307,835 B1 | * | 10/2001 | Kasper ....................... 370/229 |
| 6,356,962 B1 | * | 3/2002 | Kasper ......................... 710/29 |
| 6,625,163 B1 | * | 9/2003 | Shideler et al. ............. 370/445 |
| 6,717,910 B1 | * | 4/2004 | Kasper et al. .............. 370/229 |
| 6,967,950 B2 | * | 11/2005 | Galicki et al. .............. 370/392 |

FOREIGN PATENT DOCUMENTS

| | | |
|---|---|---|
| EP | 0 602 806 A2 | 6/1994 |
| EP | 1 014 626 A2 | 6/2000 |
| EP | 0 647 085 B1 | 8/2001 |
| JP | 10-13878 A | 1/1998 |

OTHER PUBLICATIONS

International Search Report.

* cited by examiner

ARRANGEMENT AND METHOD FOR CONTROLLING DATAFLOW ON A DATA BUS

This application is the U.S. national phase of international application PCT/SE2002/001672 filed 16 Sep. 2002 which designated the U.S. The entire contents of this application is incorporated herein by reference.

TECHNICAL FIELD OF THE INVENTION

The present invention relates to a method and arrangement for controlling dataflow on a data bus, especially for avoiding reception problems by a receiver unit, said databus connecting at least one receiver unit to one or several transmitter units.

BACKGROUND OF THE INVENTION

HDLC, High-level Data Link Control, is a popular ITU defined protocol used in data networking applications such as cellular base station switch controllers, frame relay switches, high bandwidth WAN links, xDSL and modern error correction. This protocol is responsible for transmitting data between network points. It organizes data into units, following the bit oriented packet transmission mode, and sends it across a network to a destination that verifies its successful arrival. The data stream and transmission rate is controlled from the network node (PCM highway clock) with a backpressure mechanism. This eliminates additional synchronization and buffering of the data at the network interface. Different variations of the protocol are used in different networks. For example, ISDN's D-channel uses a slightly modified version of HDLC There are many types of HDLC and examples given in the following description are merely for clarifying reasons and in no way limit the invention to the examples.

HDLC uses the term "frame" to indicate an entity of data (or a protocol data unit) transmitted from one station to another. FIG. 1 is a graphical representation of a HDLC frame with an information field.

Every frame on the link must begin and end with a flag sequence field, F. Stations attached to the data link must continually listen for a flag sequence. The flag sequence can be an octet looking like 01111110. Flags are continuously transmitted on the link between frames to keep the link active. Two other bit sequences are used in HDLC as signals for the stations on the link. According to one exemplary embodiment, these two bit sequences are:

Seven 1's, but less than 15 signals an abort signal. The stations on the link know there is a problem on the link.
15 or more 1's indicate that the channel is in an idle state.

The time between the transmissions of actual frames is called the interframe time fill. The interframe time fill is accomplished by transmitting continuous flags between frames. The flags may be in 8 bit multiples.

HDLC is a code-transparent protocol. It does not rely on a specific code for interpretation of line control. This means that a bit at position N in an octet has a specific meaning, regardless of the other bits in the same octet. If an octet has a bit sequence of 01111110, but is not a flag field, HDLC uses a technique called bit-stuffing to differentiate this bit sequence from a flag field. Once the transmitter detects that it is sending 5 consecutive 1's, in inserts a 0 bit to prevent a "phony" flag.

When the above sequence is transmitted, at the receiving end, the receiving station inspects the incoming frame. If it detects 5 consecutive 1's it looks at the next bit. If it is a 0, it pulls it out. If it is a 1, it looks at the $8^{th}$ bit. If the $8^{th}$ bit is a 1, it knows that an abort or idle signal has been sent. It then proceeds to inspect the following bits to determine appropriate action. HDLC achieves code-transparency in this manner. HDLC is not concerned with any specific bit code inside the data stream. It is only concerned with keeping flags unique.

Other fields comprise:
A: Address field
C: control field
I: Information field, and
CRC: Frame checking sequence.

The functionality of HDLC and its different fields are assumed to be known for skilled persons and not described herein in more detail.

During high loads on the bus, the routing function of the bus, i.e. the bus-master, will not function properly because its buffers become filled. Thus, the incoming traffic cannot be handled. To be able to stop the data from the slaves, i.e. the units transmitting data to the master, so that the buffers can be emptied a mechanism is needed.

It is possible to use a separate stop signal as the flow control, as illustrated in FIG. 2. FIG. 2 illustrates a simple data link comprising a number of Transmitters and a Receiver. The data flow is through an uplink bus. In case of an overflow state, the receiver signals the transmitters to stop sending data.

In JP 10013878, a stable communication processing at all times by limiting received calls from an ISDN line network depending on a data transmission quantity of a data input system is attained. A main CPU of a control unit monitors a data transmission quantity of a data highway based on a residual capacity of a dual port RAM, and a main CPU of an ISDN line interface unit monitors a data transmission quantity of the data highway 13 based on a residual capacity of a dual port RAM. When the data transmission quantity of the data highway exceeds a prescribed quantity, either or both the main CPU and the main CPU give an input reject request to a line internal bus interface/HDLC controller of the ISDN line interface unit to allow the controller to send the call reception reject request to an ISDN line network thereby limiting the arrival of succeeding data and preventing overload of reception data input system, resulting in conducting stable communication processing.

EP 647 082 concerns a data link controller (DLC), which employs buffers on both receiving and transmitting sides. These last-in, first-out buffers contain a position indicating that a character is the last one of a packet. In this way, a user need not monitor reception or transmission on a character-by-character basis, but need only concern themselves with packets. The receive and transmit FIFO's generate requests for more characters by monitoring the number of characters stored and thereby automatically receive and transmit characters without processor intervention. A four-stage mechanism permits monitoring of multiple contiguous frames (back-to-back frames) received. Control of the DLC is provided by status and control registers, which are accessible to the user via a microprocessor interface. Particular registers have bit positions monitoring status conditions in such a manner that the most-probable one of a set of conditions comprises the least-significant bit position, while the least-probable condition occupies the most-significant bit position. This affords simple shift and test technique for monitoring status conditions.

U.S. Pat. No. 5,878,279 relates to an integrated HDLC circuit of the type including at least one HDLC controller and one DMA controller, and means for organizing the access to a first external bus for connection to an external memory, via an internal bus to which are connected different entities, which require to have access to the external memory, the internal bus being connected to the first external bus via a memory controller integrated in the HDLC circuit.

In U.S. Pat. No. 5,410,542 a signal computing bus (SC-bus) includes two bus structures: (a) a synchronous TDM data transport referred to as a data bus and (b) a serial message passing bus referred to as a message bus. The following three groups of functions are performed using the SCbus: (a) data transport over the data bus, (b) message passing over the message bus, and (c) data and message bus control. In a preferred embodiment, the data bus utilizes: 2 clocks, 1 frame pulse, 16 data busses, and 1 clock control (the clock control signal enables access to the bus and automatic switching from one clock master to another when an error is detected) and the message bus is fabricated using a master HDLC protocol with contention resolution.

EP 238 255 relates to an interface arrangement, which interconnects a business communication system with a telephone station set. All signaling from the business communication system is received by the personal computer, interpreted, and appropriate control signals are then forwarded under control of the software resident on the personal computer to activate the digital telephone station set. The signals from the digital telephone station set are intercepted by the personal computer, interpreted, modified and appropriate control messages and signaling are then forwarded by the personal computer to the business communication system. This arrangement enables a user to create software on the personal computer to control the operation of the telephone station set associated with the personal computer.

None of the cited documents use the technique of the invention, as described in the following, to achieve an optimal flow control based on present protocols.

SUMMARY OF THE INVENTION

What is needed is an arrangement and method for managing a flow control on data buses using collision control detection, especially but not exclusively a HDLC bus. The method according to the present invention allows an overflow and congestion elimination on the receiver side on a bus without using additional signals and additional protocols.

Most generally, the object of the invention is to stop a flow of data to a bus master when the bus master's buffers are full and the master cannot handle incoming data.

For these reasons the method comprises the steps of transmitting by said receiver unit on said databus a control data sequence to be received by said transmitting units, which alter transmission mode upon reception of said control data sequence.

In the most preferred embodiment the transmission on said databus uses a High-level Data Link Control (HDLC) protocol. The mentioned data sequence comprises logical zeros (0) or ones (1).

In one embodiment several receiver units are arranged and each receiver unit comprises a processing unit, a memory unit, a bus driver and a logical unit. Thus, the receiver unit is connected to the uplink databus and that a stop signal is directly connected to said uplink, whereby said logic unit guarantees that said stop signal is only allowed between data frames. The logic unit is arranged to monitor the received data traffic and control the stop signal from said processing unit, such that said control data sequence is output only when the bus is inactive.

The transmission mode comprises one of transmission or blocked transmission for controlling overflow.

The invention also relates to a method for controlling dataflow on a databus, especially for avoiding reception problems by a receiver unit. The databus connects at least one receiver unit to one or several transmitter units. The method comprises the steps of transmitting by said receiver unit on said databus a control data sequence to be received by said transmitting units, which alter a transmission mode upon reception of said control data sequence. To use standard available means, transmission on said databus uses a collision detection mechanism. Most preferably, the transmission on said databus uses a High-level Data Link Control (HDLC) protocol. The data sequence comprises logical zeros (0) or ones (1).

The method further comprises the steps of: when the data traffic on said databus becomes so high that said receiver unit cannot handle the data, said data sequence is inserted in a data frame, such that when a transmitter unit, sending on said databus, receives the sequence it stops sending data. The transmitter stops sending data when it has transmitted its first logical one or zero. The transmission from a transmitter unit is stopped as long as the receiver unit outputs a different control data sequence on the databus, so that the transmitter units retransmit a stopped data message.

BRIEF DESCRIPTION OF THE DRAWINGS

In the following, the invention will be further described in a non-limiting way with reference to the accompanying drawings in which.

DETAILED DESCRIPTION OF THE EMBODIMENTS

In the following the invention is described with reference to a preferred embodiment based on a data link using HDLC protocol. However, it is possible to implement the teachings of the invention in other link configurations having collision control detection ability, especially layer 2 links, such as SDLC, SS #7 (Signaling System No. 7), APPLETALK, LAPB (Link Access Procedure Balanced), LAPD (Link Access Protocol for D-Channel) etc., based on HDLC framing structure.

The invention uses a surprising effect of a function, collision detection, imbedded in the HDLC protocol, Bus Mode. Collision detection is used to enable data transmission on the same bus to several transmitters without losing data.

This is achieved by giving a bus master (receiver) the ability to send a blocking sequence on the bus. The blocking sequence is composed of zeros (or ones depending on the protocol configuration) and is detected by all transmitters, which will abort transmission. When the blocking sequence is completed, the transmitters will retransmit aborted transmissions. Thus, conventional components can be used for flow control.

Figure 1:
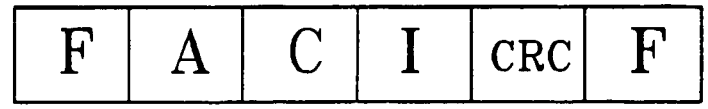
FIG. 1 schematically illustrates a frame structure of HDLC protocol.
Figure 2:
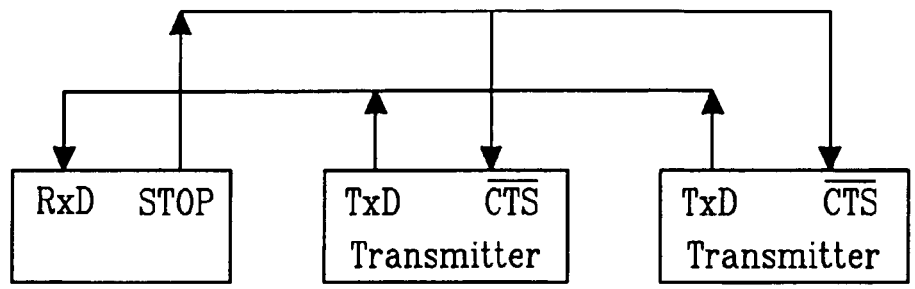
FIG. 2 illustrates a coupling diagram using an additional control signal, according to prior art.
Figure 3:
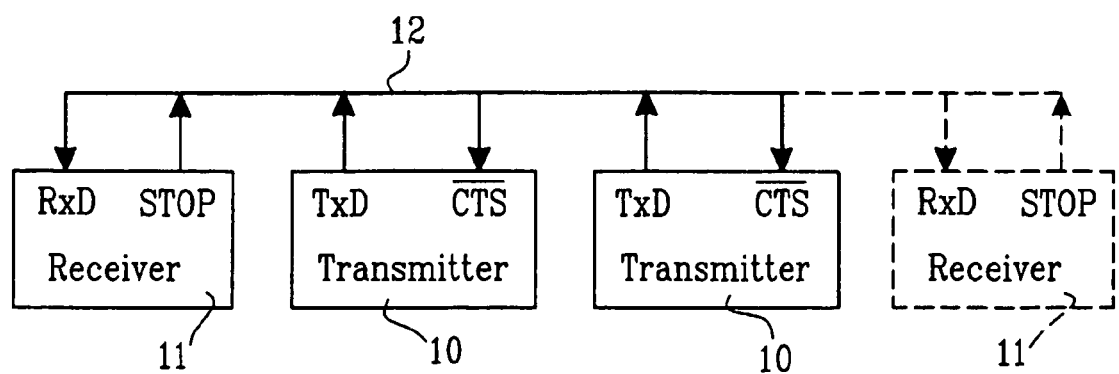
FIG. 3 illustrates a coupling diagram of an embodiment according to the present invention.

FIG. 3 is a schematic coupling diagram of a number of transmitters 10 (slaves) connected to a number of receivers 11 (masters). The transmitters 10 and receivers 11 are connected by means of a databus 12. In the most preferred embodiment only one receiver is used. However, if several receivers are used, each receiver is provided with a unique address.

In the HDLC standard logical zeros are used as a control sequence and have higher priority than logical ones. According to the invention, when the data traffic on the bus becomes so high that the receiver cannot handle the data, e.g. when its buffers are filled, zeroes are inserted in the data frame and into the uplink databus. When a transmitter, sending on the bus, receives the sequence it will stop sending data when it has transmitted its first logical one. The transmitter assumes that a collision is detected on the bus, as the HDLC bus mode protocol standard.

The transmission from a transmitter is stopped until the receiver no longer outputs zeroes on the bus. When the receiver stops sending zeros, the transmitters will retransmit the stopped data message, as a consequence of the HDLC protocol standards. Thus, no additional stop signals are needed or additional retransmission functions, which reduces the number of the connections and circuitry for handling overflow.

If two or more receivers 11 are used, each receiver must be able to stop the incoming transmission individually, depending on its load. For this reason, a controlling logic must be provided to guarantee that the frames are not interrupted in an undesired way. Otherwise, the other receivers can interpret the stop sequence as a corrupted frame, which can be difficult to separate from an actual error. In a system with only one receiver, the interrupted frame is interpreted as incorrect but it is possible to distinguish it from a real incorrectness.

Figure 4:
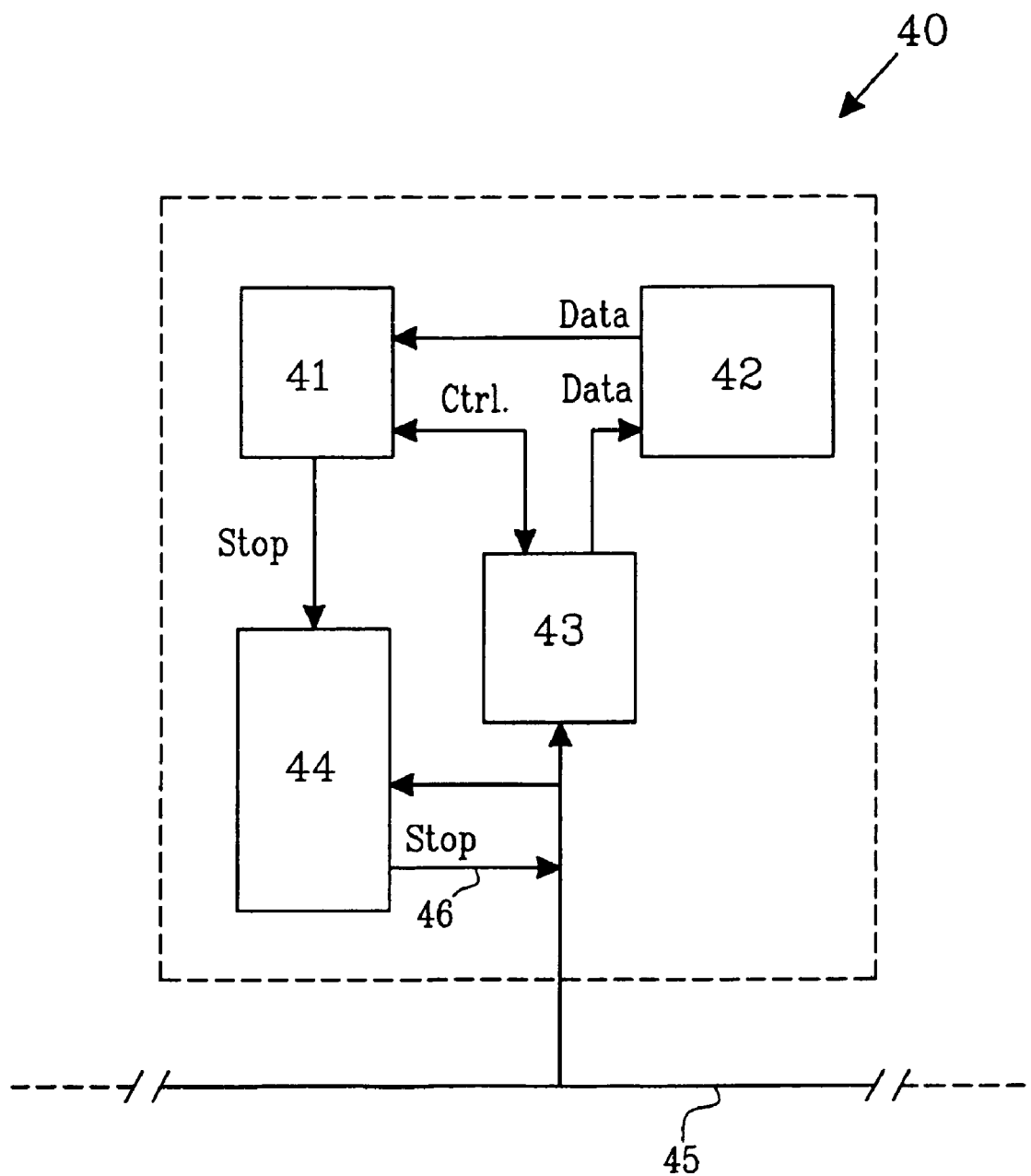
FIG. 4 illustrates a coupling diagram of a second embodiment according to the present invention.

The block diagram of FIG. 4 illustrates a receiver 40 comprising a processing unit (CPU) 41, memory unit 42, HDLC receiver 43 and logical unit 44. The input is from a HDLC uplink bus 45. The stop signal 46 is directly connected to the uplink. The logic unit 44 guarantees that the stop signal is only allowed between the frames. The logic unit operates by monitoring the received data traffic and controls the stop signal from the CPU such that the blocking sequence is output only when the bus is inactive. The memory unit comprises data received and interpreted by HDLC receiver. Clearly, this is one exemplary way of illustrating a receiver unit and other constructions may occur.

The invention is not limited to the shown embodiments but can be varied in a number of ways without departing from the scope of the appended claims and the arrangement and the method can be implemented in various ways depending on application, functional units, needs and requirements etc.

The invention claimed is:

1. A databus controller arrangement for controlling data flow in a databus, said databus being operatively arranged to connect at least one receiver unit to at least one transmitter unit, wherein said controller arrangement is operatively arranged to control a data flow, including an overflow condition at the receiver unit, using a control data sequence output on said databus to be received by said at least one transmitting unit, wherein said control data sequence includes a blocking sequence for detecting collisions.

2. The arrangement of claim 1, wherein a transmission on said databus uses a High-level Data Link Control (HDLC) protocol.

3. The arrangement of claim 1, wherein said control data sequence comprises logical zeros (0) or ones (1).

4. The arrangement according to claim 1, including several receiver units, wherein each receiver unit comprises a processing unit, a memory unit, a bus driver and a logical unit.

5. The arrangement of claim 4,
wherein said receiver unit is connected to uplink databus and that a stop signal is directly connected to said uplink, whereby said logic unit guarantees that said stop signal is only allowed between data frames.

6. The arrangement of claim 5,
wherein said logic unit is arranged to monitor the received data traffic and control the stop signal from said processing unit, such that said control data sequence is output only when the bus is inactive.

7. The arrangement of claim 1, wherein said controller arrangement is operatively arranged to use said control data sequence to alter a transmission mode of said at least one transmitting unit.

8. The arrangement according to claim 7,
wherein said transmission mode comprises one of transmission or blocked transmission.

9. A method for controlling dataflow on a databus, especially for avoiding reception problems by a receiver unit, said databus connecting at least one receiver unit to at least one transmitter unit, the method comprising transmitting by said receiver unit on said databus a control data sequence to be received by said at least one transmitting unit, wherein the control data sequence is used to control a data overflow condition at said receiver unit and includes a collision detection blocking sequence which alters a transmission mode of said at least one transmitting unit upon reception of said control data sequence.

10. The method of claim 9, wherein said transmission on said databus uses a High-level Data Link Control (HDLC) protocol.

11. The method according to claim 9, wherein said data sequence comprises logical zeros (0) or ones (1).

12. The method according to claim 9, wherein when the data traffic on said databus becomes so high that said receiver unit cannot handle the data, said data sequence is inserted in a data frame, such that when a transmitter unit, sending on said databus, receives the sequence it stops sending data.

13. The method according to claim 9, wherein said transmitter stops sending data when it has transmitted its first logical one or zero.

14. The method according to claim 13, wherein the transmission from a transmitter unit is stopped as long as the receiver unit outputs a different control data sequence on the databus, so that the transmitter units retransmit a stopped data message.

15. The method according to claim 9, wherein said transmission mode comprises one of transmission or blocked transmission.

* * * * *